(12) United States Patent
Polishchuk

(10) Patent No.: US 8,388,744 B1
(45) Date of Patent: Mar. 5, 2013

(54) SYSTEMS AND METHODS FOR USING A BOEHMITE BOND-COAT WITH POLYIMIDE MEMBRANES FOR GAS SEPARATION

(75) Inventor: Kimberly Ann Polishchuk, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/221,657

(22) Filed: Aug. 30, 2011

(51) Int. Cl.
*B01D 53/22* (2006.01)

(52) U.S. Cl. ............... 96/12; 95/43; 95/45; 95/55; 96/4; 96/11

(58) Field of Classification Search ............... 95/43, 45, 95/55; 96/4, 11, 12
See application file for complete search history.

(56) References Cited

U.S. PATENT DOCUMENTS

| | | | |
|---|---|---|---|
| 6,183,901 B1* | 2/2001 | Ying et al. | 429/129 |
| 6,190,426 B1* | 2/2001 | Thibault et al. | 29/623.2 |
| 2004/0126573 A1* | 7/2004 | Bier et al. | 428/328 |
| 2006/0154057 A1* | 7/2006 | Nonninger | 428/364 |
| 2006/0199301 A1* | 9/2006 | Basheer et al. | 438/106 |
| 2006/0293175 A1* | 12/2006 | Dai et al. | 502/208 |
| 2007/0098990 A1* | 5/2007 | Cook et al. | 428/404 |
| 2009/0017301 A1* | 1/2009 | Moireau | 428/372 |
| 2011/0005473 A1* | 1/2011 | Ishikawa et al. | 123/3 |
| 2011/0206831 A1* | 8/2011 | Asuka et al. | 427/58 |

OTHER PUBLICATIONS

Park, H.B., et al., "Polymeric Membrane Materials and Potential Use in Gas Separation," in *Advanced Membrane Technology and Applications.*, 2008, ch. 24, pp. 633-634.

Koros, W.J., et al., "Separation of Gaseous Mixtures Using Polymer Membranes," in *Handbook of Separation Process Technology*, 1987, ch. 20, pp. 862-870.

Kaldis, S.P., et al., "Simulation of multicomponent gas separation in a hollow fiber membrane by orthogonal collocation—hydrogen recovery from refinery gases," *Journal of Membrane Science*, vol. 173, pp. 61-71, 2000.

Heuchel, M., et al., "Molecular modeling of polyimide membranes for gas separation," *Desalination*, vol. 144, No. 1-3, pp. 67-72, 2002.

Loeb, S., "The Loeb-Sourirajan Membrane: How It Came About," in *Synthetic Membranes*, 1981, ch. 1, pp. 1-9.

Adhikari, S., et al., "Hydrogen Membrane Separation Technologies," *Ind. Eng. Chem. Res.*, vol. 45, pp. 875-881, 2006.

Perry, J.D., et al., "Polymer Membranes for Hydrogen Separation," *MRS Bulletin*, vol. 31, pp. 745-749, 2006.

Klaehn, J.R. et al., "Polyimides and their derivatives for gas separation applications," in *234th Annual ACS National Meeting*, 2007 (3 pages).

Klaehn, J.R. et al., "CO2 separation using thermally optimized membranes: A comprehensive project report (2000-2007)," INL, INL/EXT-07-12376, 2007 (107 pages).

Ockwig, N. W. et al., "Membranes for hydrogen separation," *Chemical Review*, vol. 107, pp. 4078-4110, 2001.

(Continued)

*Primary Examiner* — Jason M Greene
*Assistant Examiner* — Anthony Shumate
(74) *Attorney, Agent, or Firm* — Fletcher Yoder, P.C.

(57) ABSTRACT

The subject matter disclosed herein relates to gas separation membranes and, more specifically, to polyimide gas separation membranes. In an embodiment, a gas separation membrane includes a porous substrate, a substantially continuous polyimide membrane layer, and one or more layers of boehmite nanoparticles disposed between the porous substrate and the polyimide membrane layer to form a bond-coat layer. The bond-coat layer is configured to improve the adhesion of the polyimide membrane layer to the porous substrate, and the polyimide membrane layer has a thickness approximately 100 nm or less.

21 Claims, 2 Drawing Sheets

OTHER PUBLICATIONS

Bucsu, D. et al., "Modelling of biohydrogen production and recovery by membrane gas separation," *Desalination*, vol. 240, pp. 306-310, 2009.

Bucsu, D. et al., "Biohydrogen recovery and purification by gas separation method," *Desalination*, vol. 200, pp. 227-229, 2006.

Horvath, R. et al., "Application of gas separation to recover biohydrogen produced by *Thiocapsa roseopersicina*," *Desalination*, vol. 163, pp. 261-265, 2004.

Yin, Y. et al., "Synthesis, proton conductivity and methanol permeability of a novel sulfonated polyimide from 3-(2',4'-diaminophenoxy)propane sulfonic acid," *Polymer*, vol. 44, pp. 4509-4518, 2003.

Woo, Y. et al., "Synthesis and characterization of sulfonated polyimide membranes for direct methanol fuel cell," *Journal of Membrane Science*, vol. 220, pp. 31-45, 2003.

Park, H.B. et al., "Effect of crosslinked chain length in sulfonated polyimide membranes on water sorption, proton conduction, and methanol permeation properties," *Journal of Membrane Science*, vol. 285, pp. 432-443, 2006.

Meyer, G. et al., "Ex situ hydrolytic degradation of sulfonated polyimide membranes for fuel cells," *Polymer*, vol. 47, pp. 5003-5011, 2006.

Akbarian-Feizi, L. et al., "Survey of sulfonated polyimide membranes as a good candidate for nafion substitution in fuel cell," *International Journal of Hydrogen Energy*, vol. 35, pp. 9385-9397, 2010.

Kanehashi, S. et al., "Effects of carbon dioxide-induced plasticization on the gas transport properties of glassy polyimide membranes," *Journal of Membrane Science*, vol. 298, pp. 147-155, 2007.

Kapantaidakis, G.C. et al., "Gas permeation through PSF- PI miscible blend membranes," *Journal of Membrane Science*, vol. 110, pp. 239-247, 1996.

Hibshman, C. et al., "The gas separation effects of annealing polyimide-organosilicate hybrid membranes," *Journal of Membrane Science*, vol. 211, pp. 25-40, 2003.

Shao, L. et al., "Transport properties of cross-linked polyimide membranes induced by different generations of diaminobutane (DAB) dendrimers," *Journal of Membrane Science*, vol. 238, pp. 153-163, 2004.

Lau, C.H. et al.,"A vapor-phase surface modification method to enhance different types of hollow fiber membranes for industrial scale hydrogen separation," *International Journal of Hydrogen Energy*, vol. 35, pp. 8970-8982, 2010.

Shao, L. et al.,"A novel strategy for surface modification of polyimide membranes by vapor-phase ethylenediamine (EDA) for hydrogen purification," *International Journal of Hydrogen Energy*, vol. 34, No. 20, pp. 8716-8722, 2009.

Robeson, L.M., "The upper bound revisited," *Journal of Membrane Science*, vol. 320, No. 1-2, pp. 390-400, 2008.

Ratta, V., "Polyimides: Chemistry & Structure-Property Relationships—Literature Review," Virginia Plytechnic Institute , ch. 1 in Crystallization, Morphology, Therma Stability and Adhesive Properties of Novel High Performance Semicrystalline Polyimides, 1999 (26 pages).

Lee, B.H., "Polyimides," in *Coating Materials and Surface Coatings*., ch. 16, pp. 16.1-2.

Fink, J.K., "Poly(imide)s," in *High Performance Polymers*., 2008, ch. 15, pp. 475-519.

Ciba Specialty Chemicals. (Oct. 2010) Huntsman Advanced Materials Web site. [Online]. http://www.huntsman.com/advanced_materials/eng/Search/index.cfm?PageID=541, 3 (5 pages).

Pandey, P., et al.,"Membranes for gas separation," *Prog. Polym. Sci.*, vol. 26, pp. 853-893, 2001.

Hagg, M. et al., "Polymeric facilitated transport membranes for hydrogen purification," *MRS Bulletin*, vol. 31, pp. 750-755, 2006.

White, L.S. et al.,. "Properties of a polyimide gas separation membrane in natural gas streams," *Journal of Membrane Science*, vol. 103, pp. 73-82, 1995.

Hosseini, S.S. et al., "Hydrogen separation and purification in membranes of miscible polymer blends with interpenetration networks," *Polymer*, vol. 49, pp. 1594-1603, 2008.

Mota, J.P.B., "Absorption and transport in nanoporous materials," in *Nanoporous Materials—Science and Engineering*, G.Q. Zhao, X.S. Lu, Ed., 2004, ch. 22, pp. 694-726.

Wijmans, J.G., et al., "The solution-diffusion model: a review," *Journal of Membrane Science*, vol. 107, pp. 1-21, 1995.

Sada, E. et al., "Sorption and diffusion of gases in glassy polymers," *Ind. Eng. Chem. Res.*, vol. 26, pp. 433-438, 1987.

Kawakami, H. et al., "Gas transport properties in thermally cured aromatic polyimide membranes," *Journal of Membrane Science*, vol. 118, pp. 223-230, 1996.

Rowe, B.W. et al., "Influence of temperature on the upper bound: Theoretical considerations and comparison with experimental results," *Journal of Membrane Science*, vol. 360, pp. 58-69, 2010.

Clausi, D.T. et al., "Formation of defect-free polyimide hollow fiber membranes for gas separations," *Journal of Membrane Science*, vol. 167, No. 1, pp. 79-89, 2000.

Wallace, D.W. et al., "Efficient development of effective hollow fiber membranes for gas separation from novel polymers," *Journal of Membrane Science*, vol. 278, pp. 92-104, 2006.

Marek Jr., M. et al., "Ultra-thin polyimide film as a gas separation layer for composite membranes," *Polymer*, vol. 37, No. 12, pp. 2577-2579, 1996.

Widjojo, N. et al., "Enhanced gas separation performance of dual-layer hollow fiber membranes via substructure resistance reduction using mixed matrix materials," *Journal of Membrane Science*, vol. 306, pp. 147-158, 2007.

Hirayama, Y. et al., "Relation of gas permeability with structure of aromatic polyimides II," *Journal of Membrane Science*, vol. 111, pp. 183-192, 1996.

Hirayama, Y. et al., "Relation of gas permeability with structure of aromatic polyimides I," *Journal of Membrane Science*, vol. 111, pp. 169-182, 1996.

Pechar, T.W. et al., "Preparation and characterization of a poly(imide siloxane) and zeolite L mixed matrix membrane," *Journal of Membrane Science*, vol. 277, pp. 210-218, 2006.

Zhong, S.H. et al., "Preparation and characterization of polyimide-silica hybrid membranes on kieselguhr-mullite supports," *Journal of Membrane Science*, vol. 199, pp. 53-58, 2002.

Kusakabe, K. et al., "Preparation and characterization of silica-polyimide composite membranes coated on porous tubes for CO2 separation," *Journal of Membrane Science*, vol. 115, No. 1, pp. 65-75, 1996.

Yong, H.H. et al., "Zeolite-filled polyimide membrane containing 2,4,6-triaminopyrimidine," *Journal of Membrane Science*, vol. 188, pp. 151-163, 2001.

Peter, J. et al., "Multilayer composite membranes for gas separation based on crosslinked PTMSP gutter layer and partially crosslinked Matrimid(R) 5218 selective layer," *Journal of Membrane Science*, vol. 340, pp. 62-72, 2009.

Low, B.T. et al., "Amplifying the molecular sieving capability of polyimide membranes via coupling of diamine networking and molecular architecture," *Polymer*, vol. 50, pp. 3250-3258, 2009.

Garcia, M.G. et al., "Aliphatic-aromatic polyimide blends for H2 separation," *International Journal of Hydrogen Energy*, vol. 35, No. 17, pp. 8983-8992, 2010.

Hosseini, S.S. et al., "Gas separation membranes developed through integration of polymer blending and dual-layer hollow fiber spinning process for hydrogen and natural gas enrichments," *Journal of Membrane Science*, vol. 349, pp. 156-166, 2010.

Han, J. et al., "Characterization of polyethersulfone/polyimide blend membranes prepared by wet/dry phase inversion: precipitation kinetics, morphology and gas separation," *Journal of Membrane Science*, vol. 351, No. 1-2, pp. 141-148, 2010.

Hu, Q. et al., "Poly(amide-imide)/TiO2 nano-composite gas separation membranes: Fabrication and characterization," *Journal of Membrane Science*, 135 (1997) 65-79.

Beuscher, U. et al., "The permeationof binary gas mixtures through support structures of composite membranes," *Journal of Membrane Science*, 150 (1998) 57-73.

Synthetic Polymeric Membranes, "Pore Size, Pore Size Distribution, and Roughness at the Membrane Surface," *Springer Laboratory*, 101-139, DOI:10.1007/978-3-540-73994-4_5 (2008).

Synthetic Polymeric Membranes, "Membrane Surface Morphology and Membrane Performance," *Springer Laboratory*, 101-139, DOI:10.1007/978-3-540-73994-4_5 (2008) 23 pages.

Chung, T., et al., "The effect of shear rates on gas separation performance of 6FDA-durene polyimide hollow fibers," *Journal of Membrane Science*, 167 (2000) 55-56.

Engel, J., et al., "Development of polyimide flexible tactile sensor skin," *Institute of Physics Publishing, Journal of Micromechanics and Microengineering*, 13 (2003) 359-366.

Fritsch, D., et al., "Novel highly permselective 6F-poly(amide-imide)s as membrane host for nano-sized catalyts," *Journal of Membrane Science*, 99 (1995) 29-38.

Hosseini, S. et al., "Carbon membranes from blends of PBI and polyimides for $N_2/CH_4$ and $CO_2/CH_4$ separation and hydrogen purification," *Journal of Membrane Science*, 328 (2009) 174-185.

Jang, W. et al., "Characterizations and stability of polyimide-phosphotungstic acid composite electrolyte membranes for fuel cell," *Science Direct, Polymer Degradation and Stability*, 92 (2007) 1289-1296.

Joly, C. et al., "Sol-gel polyimide-silica composite membrane: gas transport properties," *Journal of Membrane Science*, 130 (1997) 63-74.

Kueper, T.W., Ph.D. Dissertation,"Sol-Gel Derived Ceramic Electrolyte Films on Porous Subtrates," *Department of Materials Science and Mineral Engineering—Lawrence Berekely Laboratory*, Berkeley, CA (May 1992) 124 pages.

Lee, H. et al., "Effect of poly(amic acid) imidization on solution characteristics and membrane morphology," *Journal of Membrane Science*, 178 (2000) 35-41.

Lee, C. et al., "Sulfonated polyimide membranes grafted with sulfoalkylated side chains for proton exchange membrane fuel cell (PEMFC) applications," *Science Direct, Journal of Membrane Science*, 313 (2008) 199-206.

Lin, W., "Gas permeability, diffusivity, solubility, and aging characteristics of 6FDA-durene polyimide membranes," *Journal of Membrane Science*, 186 (2001) 183-193.

Peng, N. et al., "The role of additives on dope rheology and membrance formation of defect-free Torlon® hollow fibers for gas separation," *Journal of Membrane Science*, 343 (2009) 62-72.

Peter, J. et al., "Synthesis of hyperbranched copolyimides and their application as selective layers in composite membranes," *Science Direct, Desalination*, 245 (2009) 516-526.

Pu, H. et al., "A new anhydrous proton conducting material based on phosphoric acid doped polyimide," *Science Direct, European Ploymer Journal*, 41 (2005) 2505-2510.

Rezac, M. et al., "Transport properties of crosslinkable polyimide blends," *Journal of Membrane Science*, 136 (1997) 249-259.

Seo, Y. et al., "Highly selective polymeric membranes for gas separation," *Science Direct, Polymer*, 47 (2006) 4501-4504.

Shao, L. et al., "Comparison of diamino cross-linking in different ployimide solutions and membranes by precipitation observation and gas transport," *Science Direct, Journal of Membrane Science*, 312 (2008) 174-185.

Shao, L. et al., "Polymeric membranes for the hudrogen economy: Contemporary approaches and prospects for the future," *Journal of Membrane Science*, 327 (2009) 18-31.

Shishatskiy, S. et al., "Comparison of asymmetric and thin-film composite membranes having Matrimid 5218 selective layer," *Elsevier, Desalination*, 199 (2006) 193-194.

Krebs, H., et al., "Polymer thin films," *Vorlesung/Lecture* (undated) 20 pages.

Winesett, DA., et al., "Substrate dependence of morphology in thin film polymer blends of polystyrene and poly(methyl methacrylate),"*Polymer International*, 49:458-462 (2000).

Xiao, S. et al., "Synthetic 6FDA-ODA copolyimide membranes for gas separation and pervaporation: Functional groups and separation properties," *Science Direct, Polymer*, 48 (2007) 5355-5368.

\* cited by examiner

SYSTEMS AND METHODS FOR USING A BOEHMITE BOND-COAT WITH POLYIMIDE MEMBRANES FOR GAS SEPARATION

STATEMENT REGARDING FEDERALLY SPONSORED RESEARCH & DEVELOPMENT

This invention was made with Government support under grant number DE-AC07-05ID 14517 awarded by the Department of Energy. The Government has certain rights in the invention.

BACKGROUND OF THE INVENTION

The subject matter disclosed herein relates to gas separation membranes and, more specifically, to polyimide gas separation membranes.

One method of purifying a gas mixture is through the use of a gas separation membrane. In general, a gas separation membrane relies upon a partial pressure differential across a porous membrane material to selectively drive gas molecules across the membrane. For a gas separation membrane to be effective, the membrane should have a sufficiently high permeance and high selectivity. Permeance is a measure of how easily a particular gas flows across the membrane, while selectivity is a measure of how much more of one component of the gas mixture (e.g., hydrogen) crosses the membrane compared to a second component of the gas mixture (e.g., carbon dioxide). Generally, as the permeance of a membrane increases, the selectivity of the membrane is reduced, making a selective membrane with a high throughput difficult to achieve.

BRIEF DESCRIPTION OF THE INVENTION

In an embodiment, a gas separation membrane includes a porous substrate, a substantially continuous polyimide membrane layer, and one or more layers of boehmite nanoparticles disposed between the porous substrate and the polyimide membrane layer to form a bond-coat layer. The bond-coat layer is configured to improve the adhesion of the polyimide membrane layer to the porous substrate, and the polyimide membrane layer has a thickness approximately 100 nm or less.

In another embodiment, a method of manufacturing a gas separation membrane includes depositing one or more layers of boehmite nanoparticles onto a porous support structure to form a bond-coat layer, and depositing a polyimide precursor onto the bond-coat layer. The method further includes performing a thermal treatment of the bond-coat layer and the polyimide precursor at 300° C. or less to form a polyimide membrane layer, wherein the polyimide membrane layer has a thickness approximately 150 nm or less.

In another embodiment, a membrane for gas separation includes a support layer. The membrane also includes an intermediate layer disposed on top of the support layer and providing a surface having a pore size less than 40 nm and having a thickness between approximately 50 and 400 nm. The membrane also includes a bond-coat layer comprising boehmite nanoparticles disposed on top of the intermediate layer and having a thickness between approximately 50 nm and 400 nm. The membrane further includes a polyimide membrane disposed on top of the bond-coat layer having a thickness between 20 and 150 nm.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

It is generally desirable to maximize both the permeance and the selectivity of gas separation membranes in pursuit of membranes that are able to quickly and selectively isolate a particular component of a mixed gas flow. A gas separation membrane may include a membrane layer deposited on top of one or more porous support layers in order to provide a high permeance membrane. However, the adhesion of the membrane layer to the underlying porous support layer in the gas separation membrane may be limited, which may lead to membrane failures during manufacturing and use.

Accordingly, the disclosed embodiments address the aforementioned issues by incorporating a boehmite nanoparticle bond-coat layer to improve the adhesion between the top membrane layer precursor solution and the underlying support layers during the manufacturing process. That is, the boehmite bond-coat enables a greater degree of covalent and/or non-covalent interactions between the precursor solution and the underlying support layers, improving the adhesion between the layers. As such, through the use of this bond-coat, the present gas membrane embodiments illustrate the synthesis and use of thinner membrane layers than previously demonstrated, further enhancing the permeance of the membrane.

Figure 1:
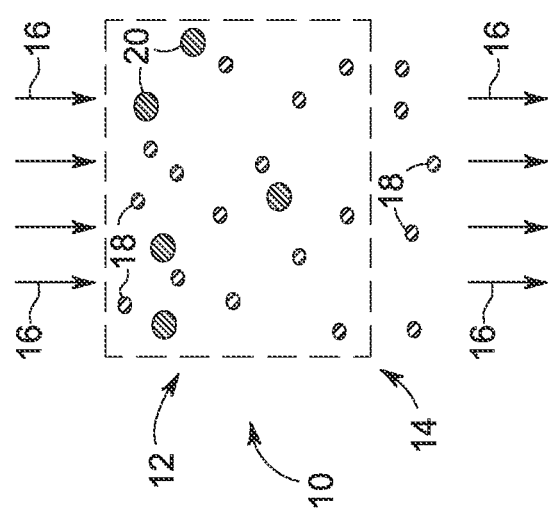
FIG. 1 is an illustration of an embodiment of a gas separation membrane.

With the foregoing in mind, FIG. 1 illustrates an embodiment of a gas separation membrane 10 being used to separate a gas mixture. For example, the gas separation membrane 10 may be used to separate the product gas mixture (e.g., hydrogen and carbon dioxide) from a water-gas shift reactor. In the illustrated embodiment, a partial pressure differential exists across the membrane 10. That is, the pressure on the top side 12 of the membrane in the illustrated embodiment may be significantly higher than the pressure on the bottom side 14 of the membrane. This pressure differential may cause a flow 16 of gas molecules across the membrane.

For example, the gas mixture present on the top side 12 of the membrane 10 may include hydrogen 18 and carbon dioxide 20 components, and the pressure differential across the membrane 10 may cause a portion of the gas mixture to enter the membrane 10. Furthermore, the partial pressure differential may cause a portion of the gas mixture that enters the gas separation membrane to completely cross the membrane 10. For example, the embodiment of FIG. 1 illustrates that, while a portion of both hydrogen 18 and carbon dioxide 20 gases may enter the gas separation membrane 10, only hydrogen 18 gas is illustrated as completely crossing the membrane 10 to reach the other side 14.

As such, FIG. 1 illustrates an ideal gas separation membrane 10 having perfect selectivity for hydrogen 18 in the presence of carbon dioxide 20. In general, gas separation membranes may reduce selectivity in order to improve permeance. For example, a relatively thick gas separation membrane may have high selectivity but may suffer from low permeance (i.e., only one species in the gas mixture substantially passes through the membrane, albeit slowly). As such, the permeance of the gas separation membrane may generally improve by thinning the membrane. However, below a certain thickness membrane defects may become numerous, resulting in a membrane having high permeance and little to no selectivity (i.e., a high flow rate and all species pass through the membrane with relative ease).

Accordingly, polymer membrane layers may be deposited on top of a porous support structure so that the membrane layer may be thinner than may be mechanically stable for a membrane layer alone. That is, a porous support structure may mechanically support a membrane that would be too thin (e.g., tens to hundreds of nanometers) to support itself. The support structure may be any porous material, such as any ceramic (e.g., alumina or silica) or metallic substrate. In certain embodiments, the support structure may have a pore size of less than approximately 40 nm.

However, the membrane layer of the gas separation membrane should be adhered securely to the porous support structure in order for the gas separation membrane to properly function. That is, a significant amount of bonding (e.g., covalent bonds or non-covalent interactions) is desirable between the membrane layer and the underlying support structure such that the membrane is substantially immobilized. If, for example, the membrane layer does not properly adhere to the surface of the porous support structure, then the membrane layer may be inadvertently removed during the membrane deposition process, as discussed in detail below. By further example, if the membrane layer does not properly adhere to the surface of the porous support structure, then the membrane layer may be completely or partially removed (e.g., blown out) by the pressure differential and gas flow experienced by the gas separation membrane during the gas separation process.

One example of a suitable ceramic support structure material is alumina. Alumina is a form of aluminum oxide that is used as a porous support for various applications. Certain types of alumina layers, such as alpha alumina layers, may be formed though the use of a binding agent and plasticizer in combination with alumina powder, as described below with respect to manufacturing an embodiment of a support layer. Other types of alumina layers, such as gamma alumina layers, may be formed by sintering layers of boehmite nanoparticles, as described below with respect to manufacturing an embodiment of an intermediate layer. Generally speaking, boehmite nanoparticles are nanoparticles of an aluminum hydroxide mineral and, therefore, the surface of the boehmite nanoparticles includes a number of hydroxyl groups. When a deposited layer of boehmite nanoparticles is sintered (i.e., solid-state sintering) the boehmite nanoparticles may release water and fuse to form a gamma alumina layer. In general, alpha alumina and gamma alumina may afford slight differences in terms of physical properties (e.g., surface roughness or porosity) such that the materials may serve different roles within different layers of the gas separation membrane.

Figure 2:
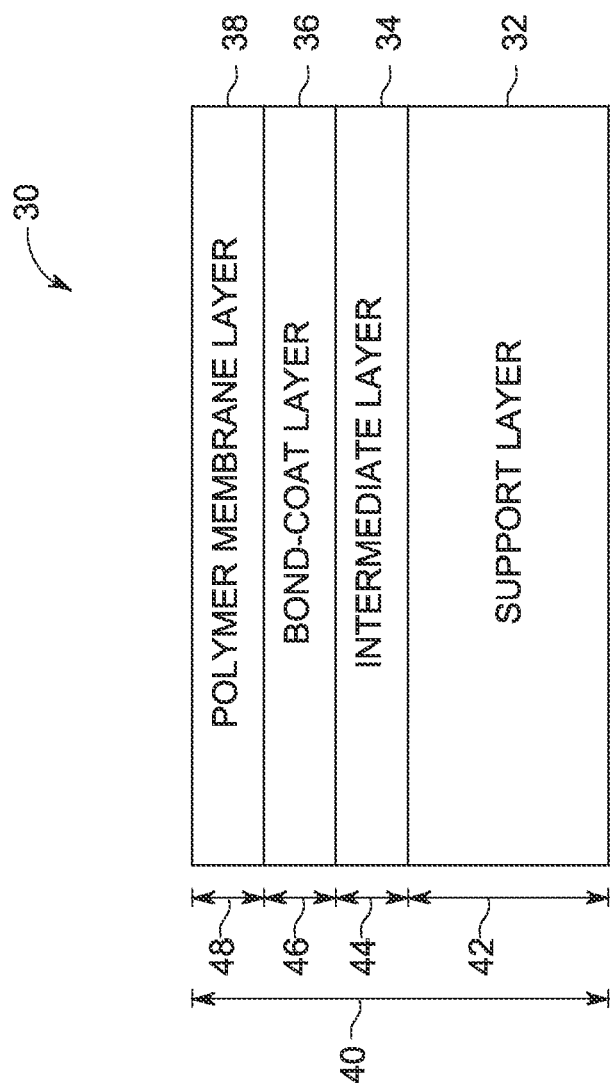
FIG. 2 is a side view illustrating the various layers of an embodiment of a gas separation membrane.

With the foregoing in mind, FIG. 2 illustrates a side-view of an embodiment of a gas separation membrane 30. The illustrated gas separation membrane 30 embodiment includes a support layer 32, an intermediate layer 34, a bond-coat layer 36, and a membrane layer 38. It should be noted that the term "support layer" is used herein to identify the specific support layer 32, while the term "support structure" is used herein to refer to all of the layers located beneath the membrane layer 38 (e.g., support layer 32, intermediate layer 34, and bond-coat 36). Similarly, the term "gas separation membrane" as used herein refers to the entire structure (e.g., gas separation membrane 30), including the support structure and the membrane layer 38, while the term "membrane layer" is used herein to refer specifically to the membrane layer 38 of the gas separation membrane 30.

The bottom layer of the illustrated gas separation membrane 30 is the support layer 32. In general, the support layer 32 is responsible for providing the mechanical strength of the membrane so as to provide a stable platform for the layers above. In certain embodiments, the support layer 32 may be a porous ceramic or metallic substrate having a pore size greater than approximately 30 nm. It should be noted that pore size, as used herein, refers to the average diameter of the substrate pores. In certain embodiments, the support layer 32 may include an alumina (e.g., alpha alumina) support material and may be manufactured from an alumina slurry, as described in detail below. The porous support layer 32 may occupy the largest portion of the total thickness 40 of the membrane 30. In certain embodiments, the support layer 32 may have a thickness 42 greater than 0.1 mm. In certain embodiments, the support layer 32 may have a thickness 42 approximately between 0.01 mm and 1 mm, 0.05 mm and 5 mm, or 0.1 mm and 0.3 mm. In an embodiment, the thickness 42 of the support layer 32 may be approximately 0.2 mm.

On top of the support layer 32 in the gas separation membrane 30 the intermediate layer 34 may be located. In general, the intermediate layer 34 affords a finer porosity and fills defects in the surface of the underlying support layer 32 to provide a smoother surface for later depositions. As such, in certain embodiments (e.g., membranes 30 that employ materials that provide a relatively smooth and defect-free support layer 32), the intermediate layer 34 may be absent from the structure of the gas separation membrane. In certain embodiments, the intermediate layer 34 may include a porous alumina (e.g., gamma alumina) material. The intermediate layer 34 may be manufactured using sintered layers of boehmite nanoparticles, as described in detail below. In certain embodiments, the intermediate layer 34 may provide a surface having a pore size less than approximately 40 nm. In certain embodiments, the intermediate layer 34 has a thickness 44 approximately between 50 nm and 500 nm, 100 nm and 400 nm, or 150 nm and 250 nm. In an embodiment, the intermediate layer 34 may have a thickness 44 of approximately 200 nm.

The next layer in the gas separation membrane 30 is the bond-coat layer 36. The bond-coat layer 36 may substantially consist of layers of boehmite nanoparticles. In general, the bond-coat layer 36 may serve to improve the adhesion of the polymer membrane layer 38 to the remainder of the support structure. That is, the aforementioned hydroxyl groups on the surface of the boehmite nanoparticles may interact with the remainder of the support structure and the polymer membrane layer 38 (e.g., covalently, non-covalently, or any combination thereof) to improve the adhesion of the polymer membrane layer 38 to the remainder of the support structure, as will be discussed in greater detail below. The bond-coat layer 36 may be manufactured by depositing a solution of boehmite nanoparticles, as described in detail below. In certain embodiments, the bond-coat layer 36 may have a thickness 46 approximately between 50 nm and 200 nm, 70 nm and 150 nm, or 60 nm and 100 nm. In an embodiment, the bond-coat layer 36 may have a thickness 46 of approximately 80 nm.

The final layer of the gas separation membrane 30 is the polymer membrane layer 38. In general, the polymer membrane layer 38 may be the limiting factor for the permeance of the gas separation membrane while providing most, if not all, of the selectivity of the gas separation membrane 30. That is, in the absence of the polymer membrane layer 38, the remaining support structure would likely exhibit higher permeance and little to no selectivity. Accordingly, the polymer membrane layer 38 may be any polyimide polymer that may be used for gas separation applications. Furthermore, the polymer membrane 38 may be substantially continuous and/or defect-free over areas as large as the pore size of the underlying intermediate layer 34 (e.g., 40 nm) and larger. As discussed in detail below, the polymer membrane layer 38 may be formed on the surface of a support structure by depositing a solution containing one or more polyimide precursors (e.g., polyamic acid) onto the surface and thermally activating the one or more precursors to bond to yield the polymer membrane layer 38. In certain embodiments, the polymer membrane layer 38 may have a thickness 48 between approximately 10 nm and 200 nm, 15 nm and 150 nm, or 20 nm to 125 nm. In an embodiment, the polymer membrane layer 38 may have a thickness 48 of approximately 30 nm.

Figure 3:
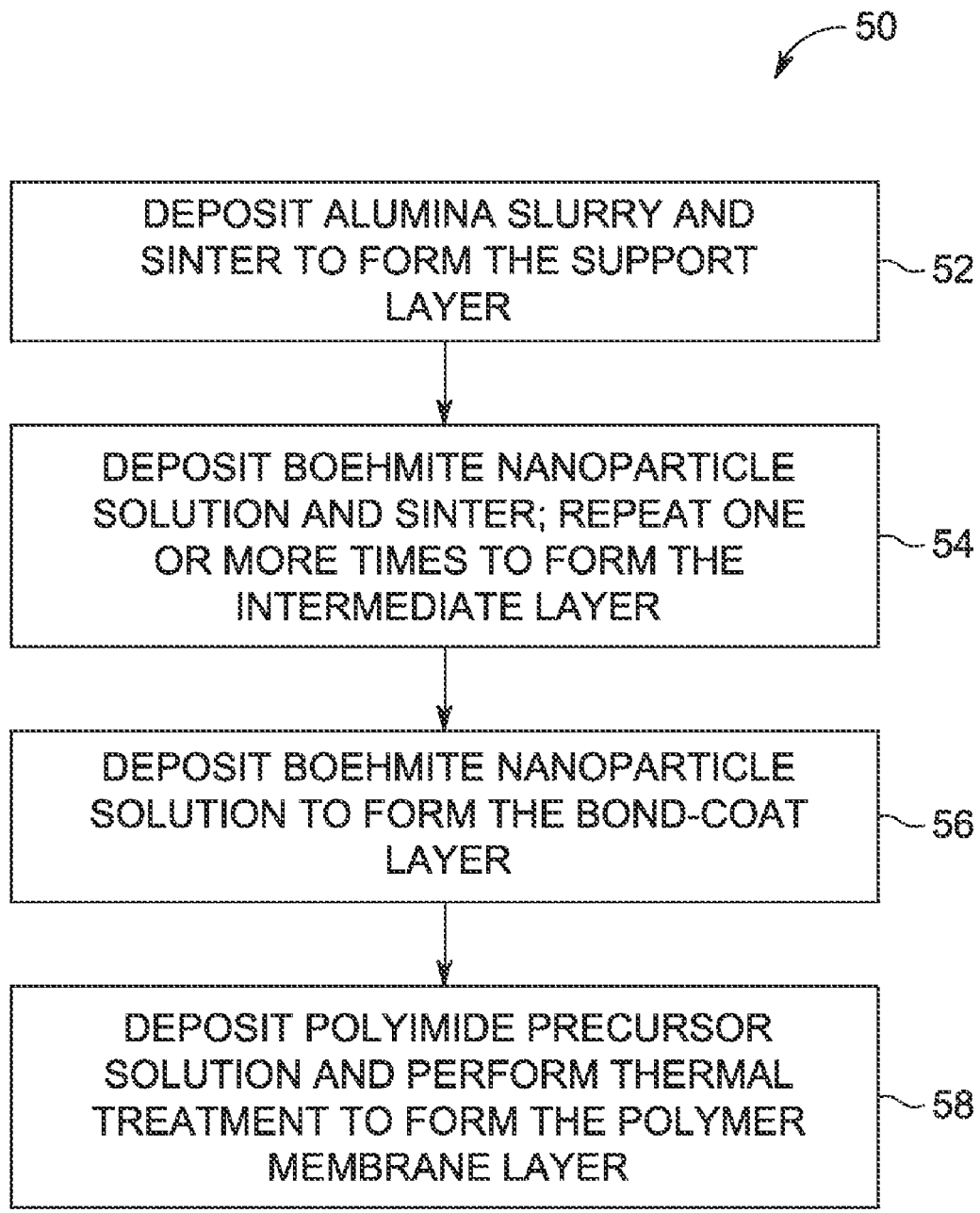
FIG. 3 is a flow diagram illustrating an embodiment of a process to manufacture the gas separation membrane.

FIG. 3 depicts one example of a process 50 by which an embodiment of the gas separation membrane 30 may be manufactured. The process 50 may begin with depositing (block 52) an alumina slurry and drying the slurry to form the support layer 32. For example, a 500 mL Nalgene™ bottle may be charged with 240 g of alumina powder, such as the TM-DAR™ 99.99% pure alumina powder available from Taimei™, and a 120 g of a 1 to 4 ethanol:xylenes solvent mixture. Also added to the bottle may be a 2.43 g of dispersant, such as the PS-236 Phospholan™ dispersant available from Akzo Nobel, and zirconia milling media (e.g., 5 mm) After combining the materials in the bottle, the mixture may be milled for approximately 14.5 hrs. In a second container, 17 g of binder, such as the Butvar® B-76™ binder available from Solutia™, and 83 g of the ethanol:xylenes solvent mixture may be added, and the contents may be milled for approximately 2 hrs. Subsequently, the 86.4 g of the contents of the second container may be added to the contents of the 500 mL bottle, along with 24.0 g of a plasticizer, such as the Paraplex® G-50™ plasticizer available from Hall-Star™. The combined contents may be subsequently milled for another 3 hrs, followed by filtration of the slurry and degassing of the slurry under vacuum. The resulting degassed slurry may be tape cast onto a Mylar™-coated glass plate using a doctor blade height of 25 mil and a pull rate of approximately 4 ft/min. Subsequently, the Mylar™-coated glass plates may be transferred to a drying cabinet to dry. Once dry, the tape-cast support layer 32 may be removed from the Mylar™-coated glass plate and cut to the appropriate dimensions. The cut films may then be thermally treated at 300° C. for 2 hrs to remove the organics and then at 1200° C. for 1 hr to sinter the alumina particles.

A solution of boehmite nanoparticles may be used in the following steps (e.g., blocks 54 and 56) of the process 50 (e.g., the formation of the intermediate layer 34 and/or the bond-coat layer 36). The boehmite nanoparticles solution may be manufactured using the following procedure as an example. To a 2 L three-neck round-bottom flask, 630 mL of water (e.g., 18 Mohm deionized water) may be added. To an addition funnel, 82 mL of aluminum sec-butoxide may be added under inert atmosphere, and the addition funnel may be subsequently coupled to the flask. The contents of the addition funnel may then be added dropwise to the contents of the flask at room temperature over approximately 30 min with regular stirring (e.g., approximately 400 rpm). Then, the addition funnel may be removed, a condenser may be added to the flask, and the flask may be introduced into a heating bath (e.g., an oil bath or an ethylene glycol bath). The heating bath may then be warmed to approximately 83-86° C., and approximately 75 mL of butanol may be distilled from the flask under vacuum. After turning off the heat, 15 mL of a 2 N nitric acid solution (e.g., prepared from ACS Plus™ 15.8 N Nitric Acid available from Fisher Scientific™) may be added. The solution may be allowed to age for approximately 20 hrs at approximately 90-105° C. before being centrifuged for approximately 2 hrs at approximately 2300 rpm and then the supernatant is filtered through a 450 nm filter. The product is the boehmite nanoparticles solution, which includes boehmite nanoparticles ranging from approximately 40 nm to 60 nm in diameter.

Once the boehmite solution has been manufactured, it may be used to form the intermediate layer 34 of the gas separation membrane. The boehmite nanoparticles solution may be deposited (block 54) onto the surface of the support layer 32 using a wet processing method (e.g., spin-coating or dip-coating), and the deposited nanoparticles may be sintered to form a continuous layer. For example, the support layer 32 may be placed in a spin-coating machine and the boehmite nanoparticles solution may be added dropwise until the surface is completely covered. The spin-coating machine may then be spun up to 4000 rpm for 40 sec. For the deposition process, the resulting thickness of the bond-coat layer may be controlled by adjusting the concentration of the boehmite nanoparticles solution. The deposited nanoparticles layer may then be sintered, or thermally treated, using a temperature ramp of 1° C./min up to 600° C., where the temperature may be maintained for approximately 3 hrs before cooling. The deposition of the boehmite nanoparticles and the sintering process may be repeated one or more times (e.g., 2 to 5 times) to form a gamma alumina intermediate layer 32, which may serve to smooth defects in the surface of the support layer 32. As previously mentioned, in certain embodiments, the intermediate layer 34 may not be present and, therefore, this step (e.g., block 54) may be skipped in such embodiments.

Next, the bond-coat layer 36 may be added to the support structure (e.g., the intermediate layer 34 or the support layer 32). The boehmite nanoparticles solution may be deposited (block 56) onto the surface of the support structure using a wet processing method (e.g., spin-coating, dip-coating, or spray-coating). For example, the support structure may be placed in a spin-coating machine and the boehmite nanoparticles solution may be added dropwise until the surface is completely covered. The spin-coating machine may then be spun up to 4000 rpm for 40 sec. As with the nanoparticles deposition for the intermediate layer 34, the resulting thickness of the bond-coat layer may be controlled by adjusting the concentration of the boehmite nanoparticles solution. However, unlike the formation of the intermediate layer 34, the deposited boehmite nanoparticles are not sintered after deposition to convert the nanoparticles to gamma alumina. On the contrary, the boehmite nanoparticles continue to express a substantial number of hydroxyl groups on the nanoparticle surfaces throughout the bond coat layer 36.

Then, a polyimide precursor solution (e.g., a poly(amic acid) solution) may be deposited (block 58) on top of the bond-coat layer 36 and may be thermally treated to form the polymer membrane layer 58. For example, a 1 to 2 weight percent solution containing polyamic acid, such as the VTEC™ 080 051 polyimide precursor available from RBI™, in a solvent, such as N-methylpyrrolidone (NMP), may be deposited onto the surface of the bond-coat layer 36 using a wet processing method (e.g., spin-coating or dip-coating). For example, the support structure having the bond-coat layer 36 on top may be introduced into a spin-coating machine and the polyamic acid solution may be added dropwise until the surface is saturated. The sample may then be spun up to 6000 rpm for 4 min. In general, the resulting thickness of the polyimide membrane layer 38 may be controlled by adjusting the concentration of the polyimide precursor solution.

It should be noted that the presence of the bond-coat layer 36 may be advantageous during the deposition of the polyimide precursor onto the surface. That is, the aforementioned hydroxyl groups present on the surface of the boehmite nanoparticles may form chemical interactions (e.g., covalent and/or non-covalent bonding) with the polyamic acid molecules, securing a greater number of polyamic acid molecules to the surface. For example, the surface hydroxyl groups of the boehmite nanoparticles may form hydrogen bonding networks that secure a substantial amount of polyimide precursor to the surface so that it may not be removed by the centrifugal force of the spin-coating machine. In the absence of the boehmite nanoparticles bond-coat layer 36, a greater amount of polyamic acid may be removed upon spinning the sample, which may decrease the potential to form a continuous polyimide film during the subsequent thermal treatment process. As such, by securing the polyamic acid molecules to the surface, the presence of the boehmite nanoparticles bond-coat layer 36 enables the formation of thinner polyimide membrane layers 38 than might otherwise be possible.

The deposited polyamic acid may subsequently be thermally treated (block 58) to form the polyimide polymer layer 38. For example, after the polyamic acid has been deposited on top of the bond-coat layer 36, the sample may be placed within a furnace and gradually heated to a 200-300° C. For example, the sample may be heated according to the following temperature program: a 10° C./min temperature ramp from room temperature (e.g., approximately 25° C.) to 50° C. and then hold for 3 hrs; a 10° C./min temperature ramp from 50° C. to 150° C. and then hold for 6 hrs; a 10° C./min temperature ramp from 150° C. to 250° C. and then hold for 12 hrs; and a $-10°$ C./min temperature ramp from 250° C. to 150° C. and then hold for 3 hrs before cooling to room temperature. Upon completion of the thermal treatment, the polyamic acid precursor may substantially be converted to a generally continuous polyimide membrane layer 38.

It should be appreciated that the thermal treatment of the polyamic acid polyimide precursor deposited on top of the bond-coat layer 36 may enable further chemical interactions between the resulting polymer membrane layer 38 and the underlying support structure. That is, beyond the hydrogen bonding interactions described above, the hydroxyl groups on the surface of the boehmite nanoparticles of the bond-coat layer 36 may react with the polyamic acid during the thermal imidization reaction in which the polyimide membrane is formed (e.g., through the formation of one or more ester linkages). Once attached, these polymer chains may remain bound (e.g., covalently bonded) to the surface of the boehmite nanoparticles as the polymer membrane 38 is being formed. Accordingly, via covalent and/or non-covalent interactions, the surface chemistry of the bond-coat layer 36 substantially improves the adhesion of the resulting polymer membrane layer 38 to the underlying support structure as compared to implementations where the bond-coat 36 may be absent.

The disclosed gas separation membrane embodiments enable the separation of a mixture of gases in a selective and efficient manner. For example, in an embodiment, a membrane structure may consist of an alpha alumina support layer, a gamma alumina intermediate layer, a boehmite bond coat layer, and a polyimide membrane layer. Such a gas separation membrane may, for example, be mounted between two gaskets (e.g., 1/16" thick silicone gaskets) and placed in a compression fitting (e.g., stainless steel) for use. Subsequently, the polyimide membrane side of the gas separation membrane may be exposed to, for example, a 50:50 mixture of $H_2$ and $CO_2$ at a certain pressure and temperature (e.g., 10 psid and 250° C.). For such embodiments, the $H_2$ and $CO_2$ permeances as well as the $H_2/CO_2$ selectivity may be determined by analyzing the composition of the gas that has crossed the membrane. In certain embodiments, the hydrogen permeances of the gas separation membrane may range between 250 GPU and 500 GPU or 300 GPU and 400 GPU (where 1 GPU equals $3.347 \times 10^{-10}$ mol/Pa·m²·s). In certain embodiments, the hydrogen permeance may be greater than about 350 GPU. Additionally, in certain embodiments the $H_2/CO_2$ selectivity of the gas separation membranes may be between 4 and 10. In certain embodiments, the $H_2/CO_2$ selectivity may be greater than about 5.

Technical effects of the invention include improving the permeance of selective gas separation membranes. The inclusion of a bond-coat layer 36 substantially improves the adhesion of the polyamic acid precursor molecules and/or the resulting polyimide polymer membrane 38 to the underlying support structure. By improving this adhesion, thinner polyimide layers may be achieved that are relatively defect-free, at least over the pore size of the underlying support structure. Since the permeance of the gas separation membrane is affected by the thickness of the membrane layer, the inclusion of the bond-coat layer allows for the production of gas separation membranes having relatively higher permeance while still maintaining relatively high selectivity. That is, the current disclosure enables the production of a gas separation membrane having a high permeance for a particular gas (e.g., hydrogen gas) while maintaining a low permeance for another gas (e.g., carbon dioxide).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas separation membrane comprising:
    a porous substrate;
    a substantially continuous polyimide membrane layer; and
    one or more layers of boehmite nanoparticles disposed between the porous substrate and the polyimide membrane layer to form a bond-coat layer, wherein the polyimide membrane layer has a thickness approximately 100 nm or less.

2. The gas separation membrane of claim 1, wherein the bond-coat layer is configured to improve the adhesion of the polyimide membrane layer to the porous substrate.

3. The gas separation membrane of claim 1, wherein the boehmite nanoparticles are substantially between approximately 40 nm and 60 nm in diameter.

4. The gas separation membrane of claim 1, wherein the one or more layers of boehmite nanoparticles form a contiguous bond-coat layer on the porous substrate.

5. The gas separation membrane of claim 1, wherein the polyimide membrane layer has a thickness between approximately 20 nm and 100 nm.

6. The gas separation membrane of claim 1, wherein the gas separation membrane has a hydrogen to carbon dioxide selectivity ratio greater than approximately 4.7 and a hydrogen permeance greater than approximately 10 GPU.

7. The gas separation membrane of claim 1, wherein the gas separation membrane has a hydrogen permeance greater than approximately 350 GPU at 250° C.

8. The gas separation membrane of claim 1, wherein the gas separation membrane has a hydrogen to carbon dioxide selectivity ratio greater than approximately 5.

9. A method of manufacturing a gas separation membrane comprising:
depositing one or more layers of boehmite nanoparticles onto a porous support structure to form a bond-coat layer; and
depositing a polyimide precursor onto the bond-coat layer; and
performing a thermal treatment of the bond-coat layer and the polyimide precursor at approximately 300° C. or less to form a polyimide membrane layer, wherein the polyimide membrane layer has a thickness approximately 150 nm or less.

10. The method of claim 9, wherein the support structure comprises a porous ceramic or metallic substrate having a pore size less than approximately 40 nm.

11. The method of claim 9, wherein the one or more layers of boehmite particles are deposited on the porous support structure using a wet processing method comprising spin-coating, dip-coating, or spray-coating.

12. The method of claim 9, wherein the bond-coat layer has a thickness between approximately 50 nm and 400 nm.

13. The method of claim 9, wherein the thermal treatment of the bond-coat layer and the polyimide precursor to form the polyimide membrane layer is performed between approximately 200° C. and 300° C.

14. The method of claim 9, wherein the polyimide layer has a thickness between approximately 20 nm and 100 nm.

15. The method of claim 9, wherein the polyimide precursor comprises a polyamic acid solution.

16. The method of claim 15, wherein the polyimide precursor is deposited on the porous support structure using a wet processing method comprising spin-coating, dip-coating, or spray-coating of the polyamic acid solution.

17. A membrane for gas separation comprising:
a support layer;
an intermediate layer disposed on top of the support layer and providing a surface having a pore size less than approximately 40 nm and having a thickness between approximately 50 and 400 nm;
a bond-coat layer comprising boehmite nanoparticles disposed on top of the intermediate layer and having a thickness between approximately 50 nm and 400 nm; and
a polyimide membrane layer disposed on top of the bond-coat layer having a thickness between approximately 20 and 150 nm.

18. The membrane of claim 17, wherein the support layer comprises a porous ceramic or metallic substrate having a pore size greater than approximately 30 nm.

19. The membrane of claim 17, wherein the support layer, the intermediate layer, or both, comprise alumina or silica.

20. The membrane of claim 17, wherein the membrane has a hydrogen permeance greater than 350 GPU at 250° C.

21. The membrane of claim 17, wherein the bond-coat layer enhances the adhesion between the polyimide membrane layer and the intermediate layer.

* * * * *